United States Patent [19]
Panter

[11] Patent Number: 5,890,298
[45] Date of Patent: Apr. 6, 1999

[54] VEHICLE CENTERING APPARATUS

[75] Inventor: Ronald L. Panter, Flushing, Mich.

[73] Assignees: Progressive Tool & Industries Co., Southfield; Panter Master Controls, Inc., Mt. Morris, both of Mich.

[21] Appl. No.: 863,845

[22] Filed: May 27, 1997

Related U.S. Application Data

[60] Provisional application No. 60/021,814 Jul. 16, 1996.

[51] Int. Cl.[6] .................................................. G01B 5/25
[52] U.S. Cl. .......................................................... 33/203.12
[58] Field of Search ....................... 33/286, 288, 203.12, 33/203.14, 203.15, 335, 533, 549

[56] References Cited

U.S. PATENT DOCUMENTS

| | | |
|---|---|---|
| 3,532,433 | 10/1970 | Hopkins et al. . |
| 3,680,369 | 8/1972 | Merrill ................................. 33/203.12 |
| 3,841,759 | 10/1974 | Turner . |
| 4,498,243 | 2/1985 | Kashiwagi ........................... 33/203.12 |
| 4,634,275 | 1/1987 | Yoshida et al. . |
| 4,679,327 | 7/1987 | Fouchey et al. ......................... 33/288 |
| 4,679,935 | 7/1987 | Fukuda et al. . |
| 4,907,877 | 3/1990 | Fukuda et al. . |
| 4,948,249 | 8/1990 | Hopkins et al. . |
| 5,078,490 | 1/1992 | Oldweiler et al. . |
| 5,111,585 | 5/1992 | Kawashima et al. ................ 33/203.12 |
| 5,164,785 | 11/1992 | Hopkins et al. . |
| 5,210,589 | 5/1993 | Kaya et al. . |
| 5,331,393 | 7/1994 | Hopkins et al. . |
| 5,355,586 | 10/1994 | Fukuda et al. ........................ 33/203.12 |
| 5,373,357 | 12/1994 | Hopkins et al. . |
| 5,379,104 | 1/1995 | Takao . |
| 5,392,111 | 2/1995 | Murata et al. . |
| 5,426,500 | 6/1995 | Ohana . |
| 5,522,145 | 6/1996 | Chisum .................................... 33/288 |

FOREIGN PATENT DOCUMENTS

| | | |
|---|---|---|
| 185800 | 7/1986 | European Pat. Off. . |
| 1360619 | 7/1974 | United Kingdom . |

OTHER PUBLICATIONS

UK Search Report dated Sep. 25, 1997 for UK application No. GB 9714755.7.

*Primary Examiner*—G. Bradley Bennett
*Attorney, Agent, or Firm*—Young & Basile, P.C.

[57] ABSTRACT

An apparatus for longitudinally centering the front and rear pairs of vehicle wheels includes a frame having pairs of laterally movable tables, each for receiving one of the vehicle wheels. Pusher members are engageable with each vehicle wheel. A centering mechanism is connected to the pusher members and normally biases the pusher members laterally outward such that laterally inward movement of one of the pusher members due to engagement with an off center vehicle will be resisted by the centering apparatus which will in turn urge the pusher members laterally outward moving the vehicle wheels and the tables laterally outward to a longitudinally centered position. Preferably separate pairs of tables, pusher members and a centering mechanism are provided for each of the front and rear pairs of vehicle wheels.

12 Claims, 6 Drawing Sheets

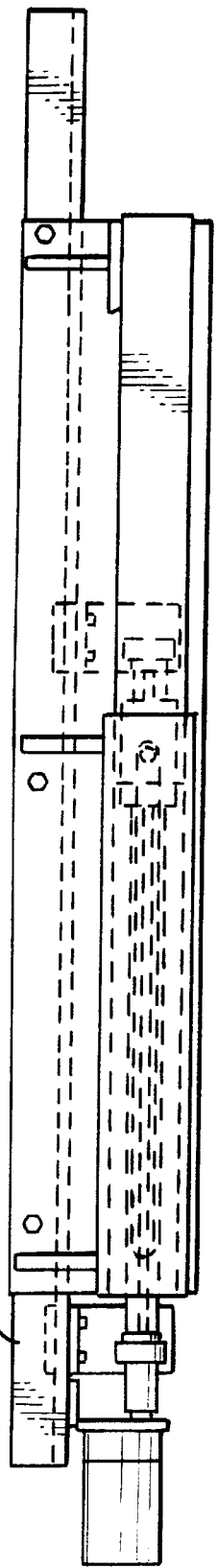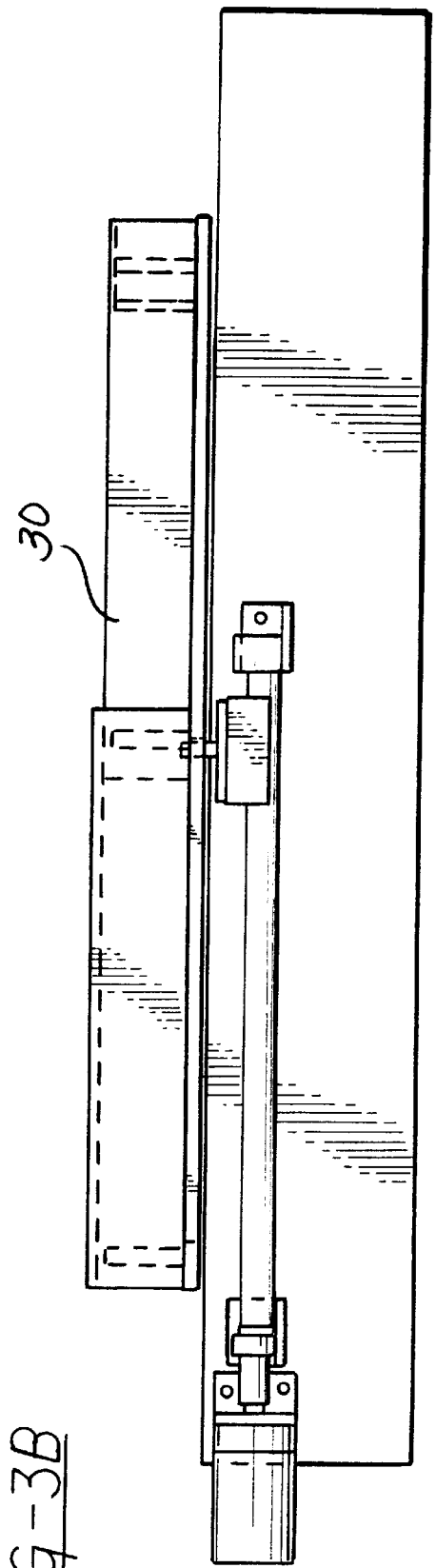
FIG-3A
FIG-3B

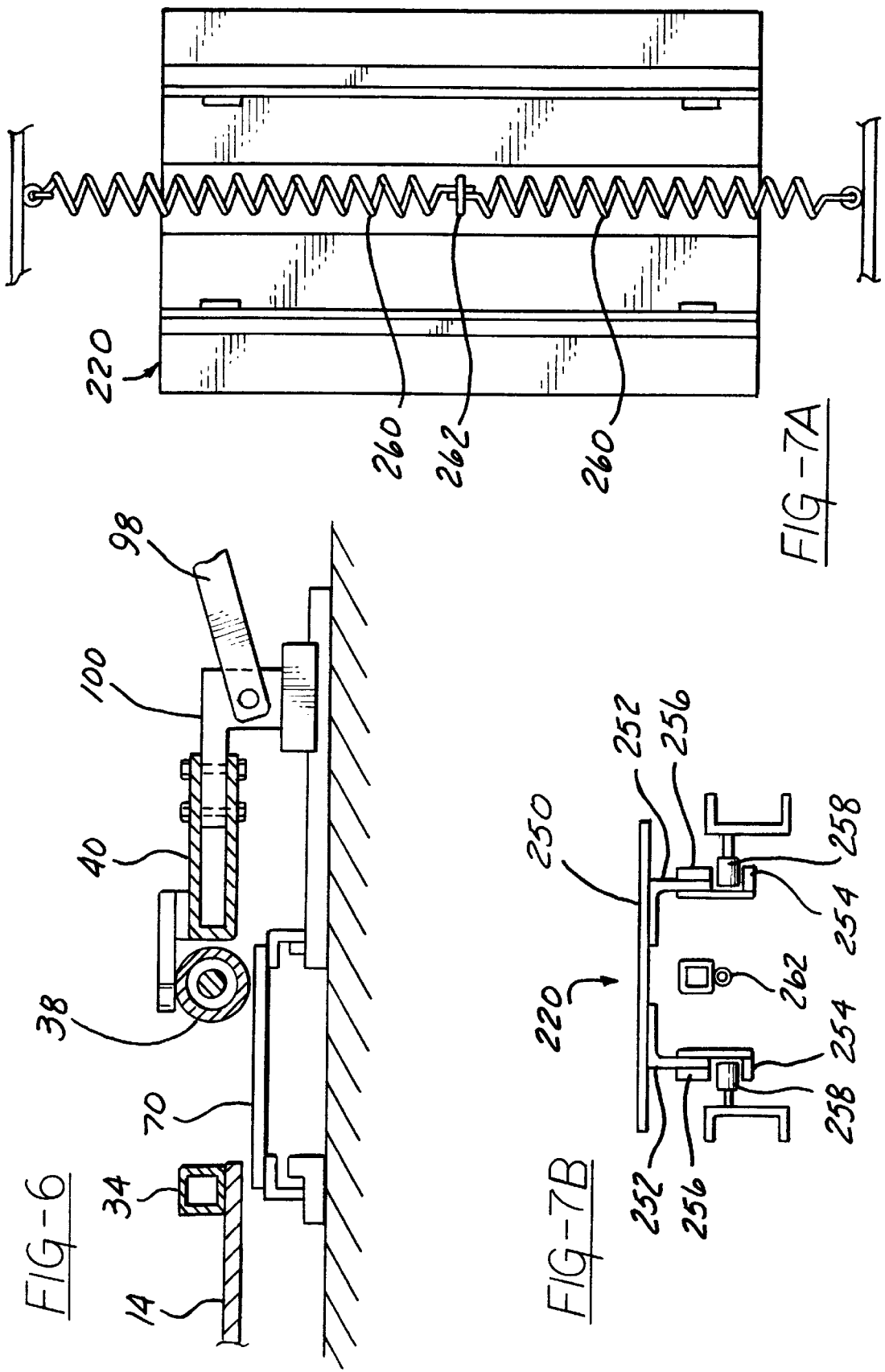

VEHICLE CENTERING APPARATUS

This application claims the benefit of U.S. Provisional application Ser. No. 60/021,814 filed Jul. 16, 1996.

BACKGROUND OF THE INVENTION

1. Field of the Invention

The present invention relates, in general, to vehicle headlight aiming apparatus and, more specifically, to vehicle centering apparatus for use with vehicle headlight aiming apparatus.

2. Description of the Art

Vehicle headlights must be aimed according to standards, such as an SAE standard in the United States and different but similar standards in Europe and Japan. Typically, a light beam is projected onto a target board set 25 feet in front of the vehicle. An ideal light beam pattern or image imprinted on the target board is manually compared with the light beam image or pattern from the vehicle and manual adjustments, as necessary, made to the headlight support structure to properly coincide the headlight beam pattern with the standard image pattern.

Another method utilizes the reflection of a light beam from a vehicle headlight through a lens and off of a screen to a camera which produces a digitized image of the reflected light beam. The focal length of the lens and the distance between the lens and the screen are optically equivalent to the 25 foot distance between the headlight and target board described above. The digitized image is then analyzed by an algorithm executed by a processor to locate the highest intensity pattern or "hot spot" which is considered to be the main optical axis of the headlight. The headlight is adjusted, as necessary, to align the hot spot with the hot spot of a properly aligned headlight according to the various standards.

Since all headlights including both low and high beam lights in each vehicle made in a manufacturing plant must be properly aimed, consideration must be taken as to the integration of the headlight aiming procedure in the typically high speed production line. Due to high production rates, vehicles have been directed to a plurality of individual headlight aiming stations. The multitude of stations adds expense to the aiming operation and may introduce variability in the aiming results between the different stations. Other aiming apparatus, which have been incorporated directly into the production line, must be moved into a position in front of each vehicle at the proper time. This has met with problems in repeatably aligning the headlight aiming apparatus with each vehicle.

A unique headlight aiming apparatus is disclosed in pending application Ser. No. 08/699,521, filed Sep. 4, 1996, and entitled "HEADLIGHT AIMING APPARATUS". In this apparatus, a gantry spans a vehicle production line and has a housing containing a camera movably disposed thereon and movable between various headlight aiming positions with respect to a vehicle positioned in proximity with the gantry. However, despite the variable positioning of the camera housing across the front of the vehicle, it is still necessary to properly orient the vehicle headlights transversely to the longitudinal axis of the aiming device to ensure proper aiming accuracy.

Thus, it would be desirable to provide a vehicle centering apparatus which can be easily integrated into a vehicle assembly line for maximum vehicle production while still properly orienting a vehicle with respect to a headlight aiming apparatus. It would also be desirable to provide a vehicle centering apparatus which is capable of longitudinally centering a vehicle with respect to a longitudinal center line of a headlight aiming apparatus and/or the vehicle assembly line regardless of the longitudinal axial position of the vehicle as it enters a headlight aiming station.

SUMMARY OF THE INVENTION

The present invention is an apparatus for longitudinally centering a vehicle.

The apparatus includes a platform having at least one pair and preferably two pair of laterally movable tables mounted thereon. A pusher means is provided for each pair of tables and is engageable with the wheels of a vehicle positioned on the platform. Biasing means are coupled with each pusher means for biasing the pusher means and the vehicle engaged therewith tables equidistantly about a longitudinal centerline of the platform by equalizing the distance between the vehicle wheels and the longitudinal centering of the platform by moving the tables laterally outward.

In a preferred embodiment, the biasing means comprises a spring having at least one end coupled to a pair of pivotal arms. The arms are normally urged laterally outward with respect to each other by the spring for pushing the pusher means laterally outward with respect to the longitudinal center line of the platform. Preferably, the pusher means is in the form of a pair of longitudinally extending rails engageable with the front or rear pair of vehicle wheels.

In a preferred embodiment, a pair of tables, pusher means and biasing means are provided for each of the front pair of vehicle wheels and for the rear pair of vehicle wheels to insure that the front and rear ends of the vehicle are both longitudinally aligned with a longitudinal centerline of the platform.

The vehicle centering apparatus of the present invention automatically centers at least one end and preferably both the front and rear ends of a vehicle with respect to a longitudinal reference axis, such as a longitudinal axis extending through a centering platform and an adjacent headlight aiming apparatus. The centering apparatus automatically centers the vehicle in a quick, expeditious manner thereby enabling the centering apparatus to be employed directly in a vehicle production line or vehicle subassembly line to maximize vehicle production while insuring that all of the vehicle headlights are properly aimed.

BRIEF DESCRIPTION OF THE DRAWINGS

The various, features, and other uses of the present invention will become more apparent by referring to the following detailed description and drawing in which:

FIGS. 3A and 3B are plan and side elevational views, respectively, of the stop mechanism shown generally in FIGS. 1 and 2;

FIG. 6 is a cross-sectional view generally taken along line 6—6 in FIG. 2; and

FIGS. 7A and 7B are plan and end views, respectively, of one of the front live tables shown in FIGS. 1 and 2.

DESCRIPTION OF THE PREFERRED EMBODIMENT

Figure 1:
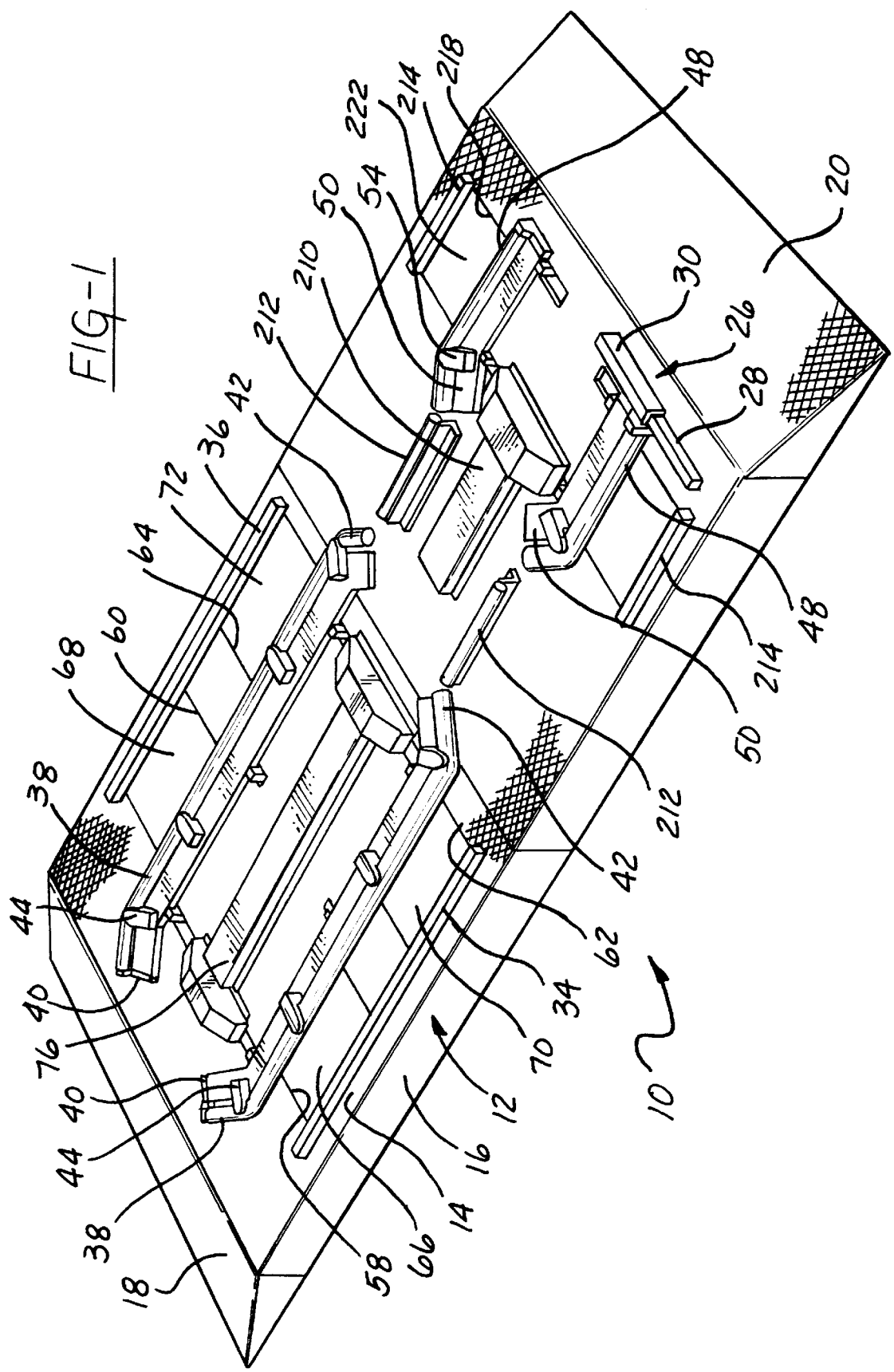
FIG. 1 is a perspective view of a centering apparatus constructed in accordance with the teachings of the present invention.
Figure 2:
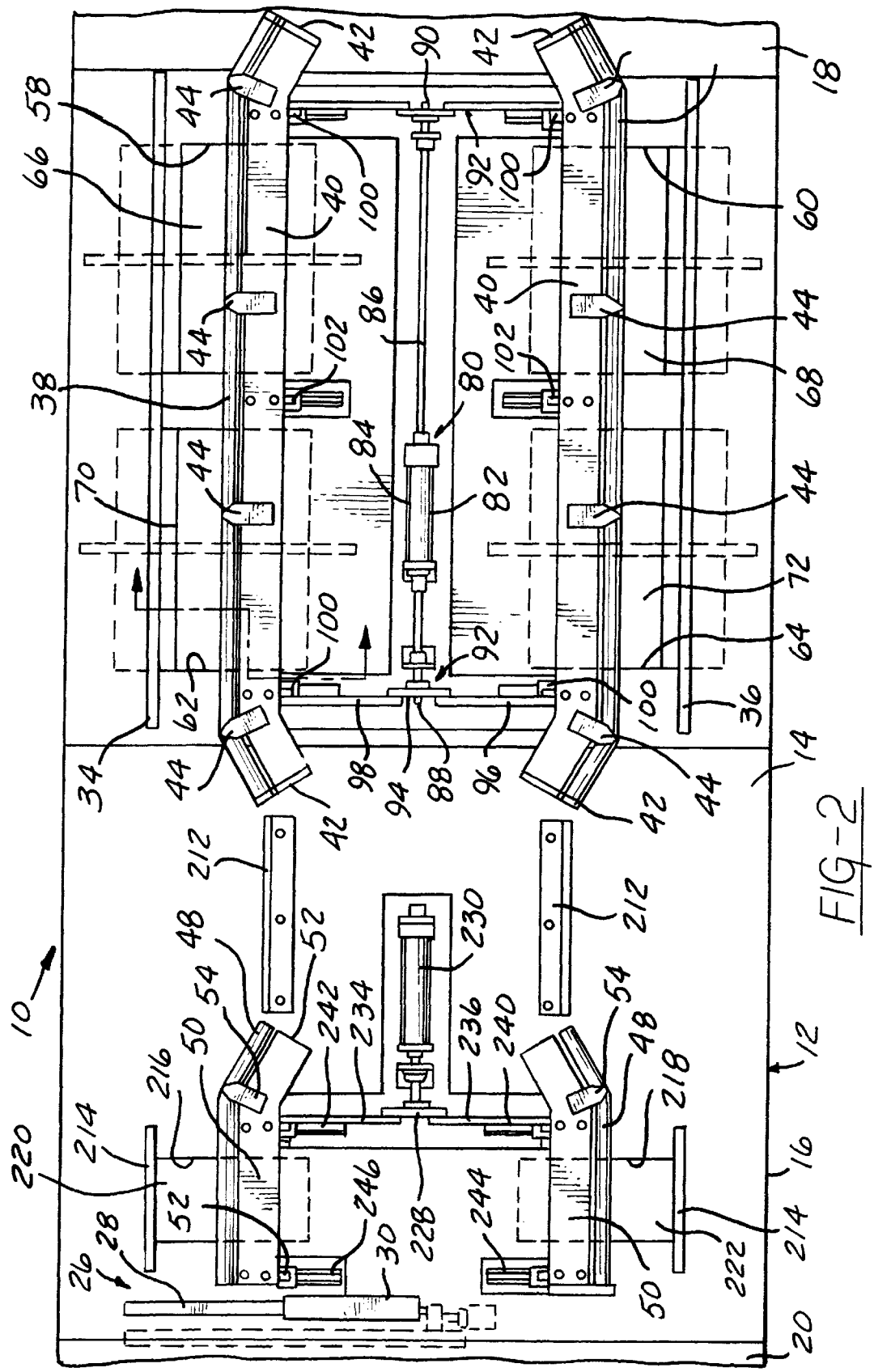
FIG. 2 is a plan view of the centering apparatus shown in FIG. 1, with the spring covers removed.

Referring now to the drawing, and to FIGS. 1 and 2 in particular, there is depicted a centering apparatus 10 suitable for centering an object, such as a vehicle, along a reference longitudinal centerline which is centered along the longitudinal axis of the centering apparatus 10.

The centering apparatus 10 is formed of one or more frame sections denoted by reference number 12. The frame section or sections 12 are formed with top surface plate 14, opposed side walls 16, and opposed end walls. If the frame 12 is formed of more than one section, each section is fixedly joined to the adjacent section by means of suitable fasteners, such as nuts and bolts, welding, etc.

First and second end ramps 18 and 20 are disposed on opposite ends of the frame 12. First ramp 18 is referred to hereafter as the rear ramp; while the second ramp 20 is referred to as the front ramp. This is by convention only since in an exemplary application of the centering apparatus 10 for centering a vehicle along the longitudinal centerline or axis of the centering apparatus 10, the front end of the vehicle will be located adjacent to the second ramp 20; while the rear end of the vehicle is located adjacent the rear ramp 18.

A stop means denoted generally by reference number 26 in FIGS. 1, 2, 3A and 3B is mounted on the frame 12 adjacent to the front ramp 20. Generally, the stop means 26 includes a moveable stop member, such as a tubular stop bar 28, which is reciprocated from the stop position shown in FIGS. 2 and 3A in which the stop bar 28 blocks further advance of a vehicle positioned on the frame 12 to a retracted position, shown in FIGS. 1 and 3B wherein the stop bar 28 is retracted from the direction of advance of the vehicle on the frame 12. Suitable reciprocating means, such as an electric motor driven cylinder 30, is positioned within the base 12 for reciprocating the stop bar 28 between the extended and retracted positions. The motor is actuated by commands from a suitable controller, such as a programmable logic controller, not shown.

Mounted on the top surface plate 14 of the frame 12 are a pair of elongated fixed support members 34 and 36 shown in FIGS. 1 and 2. The fixed support members 34 and 36 are generally in the form of a square cross-section bar which is fixedly mounted, such as by welding, to the top surface plate 14. Each fixed support member 34 and 36 extends from a first end of the frame 12, adjacent to the rear ramp 18, to an opposed second end generally intermediate the opposed ends of the frame 12.

Pusher means are mounted on the frame 12 above the top surface plate 14 adjacent to a plurality of moveable tables, described hereafter, to move an object, such as a vehicle, disposed on the movable tables to the longitudinally centered position on the frame 12. The pusher means includes an elongated roller 38 extending longitudinally on each side of the frame 12. Each roller 38 extends generally parallel to one of the fixed supports 34 and 36 and is spaced laterally inboard from the respective one of the fixed supports 36 and 38. Each roller 38 may also be formed of a plurality of individual tubular members rotatably about a center rod, not shown, and supported by roller support member 40. The roller support members 40 carry a pair of plates 42 at opposite ends which support the center rod supporting each roller 38. In addition, a plurality of spaced support blocks 44 are mounted on the support members 40 and extend laterally over and engage one end of each roller 38.

Similarly, pusher means for the front end of an object mounted on the frame 12 also includes a pair of laterally spaced front rollers 48 formed of at least one and preferably two sections each rotatably mounted about a center rod. Roller supports 50 are fixedly mounted on the top surface plate 14 and carry end plates 52 which support the center rod for the rollers 48. At least one support block 54 extends from each roller support 50 laterally outward from the roller support 50 to rotatably support adjacent ends of the rollers 48.

As shown in FIGS. 1 and 2, a pair of laterally spaced apertures 58 and 60 are formed in the top surface plate 14 of the frame 12 generally adjacent to the end of the frame 12 abutting the rear ramp 18. A second pair of laterally spaced apertures 62 and 64 are also formed in top surface plate 14 adjacent to the first pair of apertures 58 and 60. The aperture 62 is longitudinally aligned with the aperture 58; and the aperture 64 is longitudinally aligned with the aperture 60. Two pairs of apertures are provided for accommodating different length vehicles.

A pair of rear, moveable, live tables 66 and 68 are movably disposed below the top surface plate 14 adjacent the rear end of the frame 12 and are mounted for lateral movement within the apertures 58 and 60. A second pair of moveable live tables 70 and 72 are disposed within the aperture 62 and 64 in the top surface plate 14 and are likewise mounted for lateral bidirectional movement with respect to the longitudinal centerline or axis of the frame 12. As each of the rear live tables 66, 68, 70, and 72 are substantially identically constructed, the following description for the rear live tables 66 will be understood to remaining rear live tables 68, 70, and 72.

The rear live table 66 has a top plate with downward extending, laterally spaced support members mounted at opposed, laterally inboard and outboard ends. As shown in FIGS. 7A and 7B for a front live table, the support members are fixed to elongated rails. A cam follower mounted on a support fixed to the frame 12 engages the rails to control sliding movement of the rear live table 66. Biasing springs are connected to each rear live table 66, etc., as described hereafter, for the front live tables.

A rear cover assembly 76, shown in FIG. 1, is disposed along the longitudinal centerline of base 12 between the roller support members 40. The rear cover assembly 76 extends above the top surface plate 14 and is removably affixed thereto, such as by suitable fasteners, not shown. The rear cover assembly 76 covers and provides access to the rear centering spring assembly.

Rear centering means 80, seen in FIGS. 2 and 5A–5C, is provided in the frame 12 for centering the rear end of an object, such as a vehicle, mounted on any of the pairs of rear live tables 66 and 68, and 70 and 72. The rear centering means includes a rear centering spring assembly 80 formed of an elongated tube 82 surrounded by a torsion spring 84. Opposed ends of the spring 84 are coupled to an elongated spring shaft 86 which extends through the spring 84 and the tube 82 and terminates in opposed first and second ends 88 and 90.

Identical spring arm assemblies 92 are connected to each of the first and second ends 88 and 90 of the back spring shaft 86. As shown more clearly in FIG. 5B, the first end 88 of the spring shaft 86 is fixedly mounted in a pivot block 94. One end of first and second pivot arms 96 and 98, respectively, are pivotally mounted to the pivot block 94 and at an opposite end to separate slam arms 100. Each slam arm 100 generally is in the form of an L-shaped member slidably mounted on laterally extending guide tracks fixed to the frame 12. A similar pair of pivot arms 96 and 98 are pivotally mounted to a pivot block 94 fixedly mounted on the second end 90 of the back spring shaft 86. Each pivot arm 96 and 98 is pivotally connected to opposed slam arms 100 as shown in FIGS. 2 and 5A.

A pair of intermediate or idler back slam arms 102 are slidably mounted on guide tracks fixed on the frame 12 intermediate the opposed pairs of slam arms 100. Each slam arm 100 and 102 has an upper end portion insertable into an aperture in one of the roller support members 40 as shown in FIG. 6. The upper end portion of each slam arm 100 is fixedly secured, such as by nuts and bolts, to the roller support member 40.

Figure 5B:
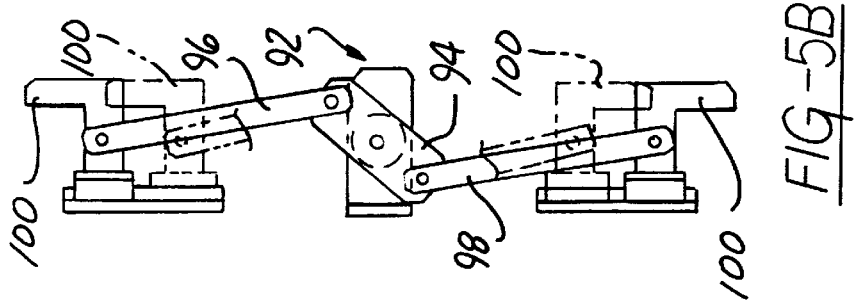
FIGS. 5A, 5B and 5C are top plan, end and side elevational views, respectively, of the rear spring and arm assembly shown partially in FIG. 2.
Figure 5A:
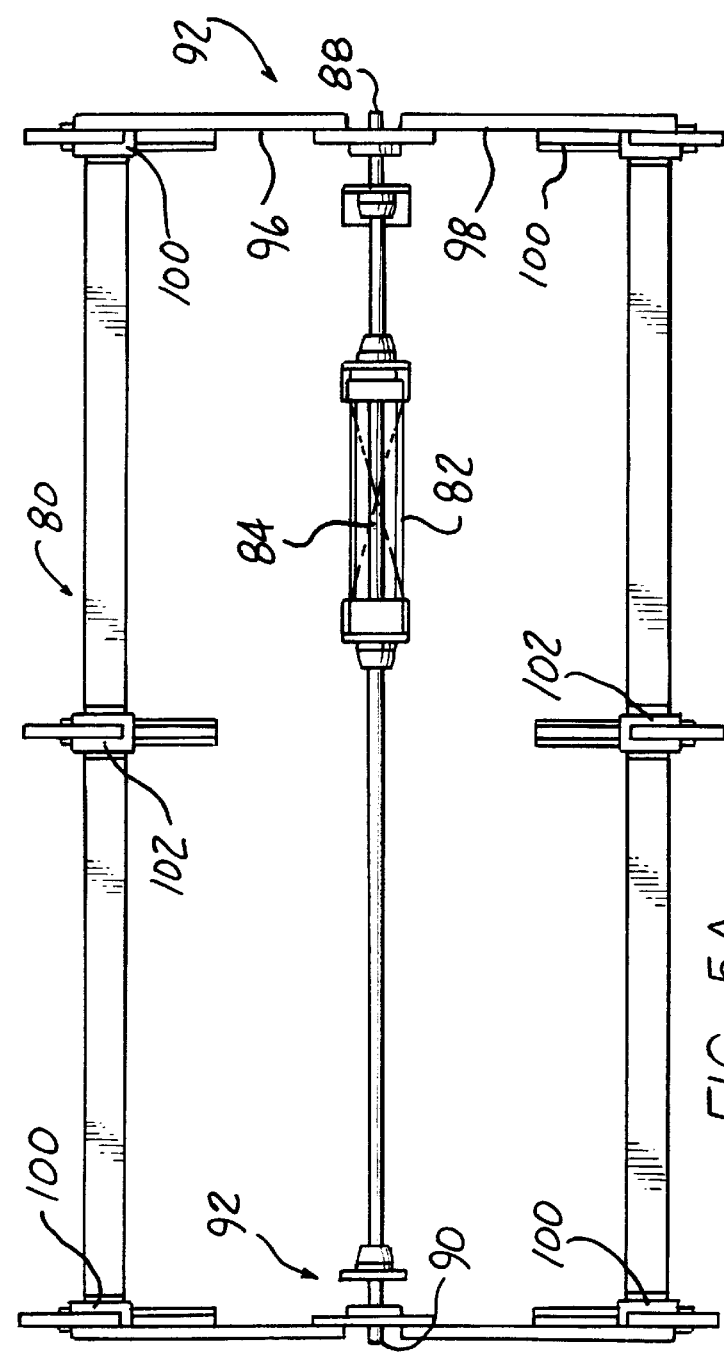
Figure 5C:
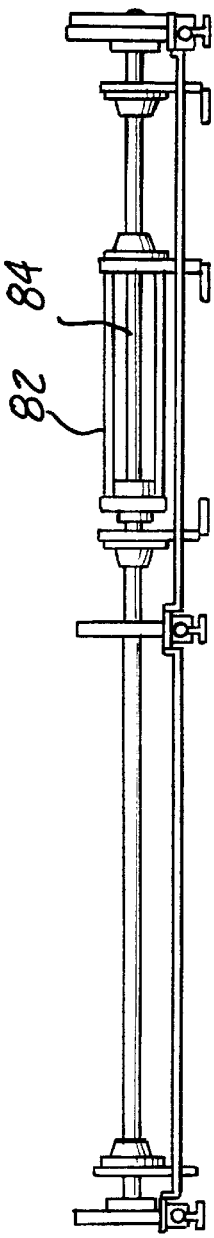

Torsion spring 84 exerts a torsional force on the back spring shaft 86 to normally bias the shaft 86 in a direction causing each pivot block 94 to bias the pivot arms 96 and 98 and the slam arms 100 and 102 laterally outward from the longitudinal centerline of the back spring shaft 86 to a normal laterally outboard position shown in FIG. 5B. In this position, slam arms 100 and 102 urge the roller support members 40 and the attached rollers 38 to a normal laterally outboard position as shown in FIGS. 1 and 2.

A pair of rails 212 extend in parallel between one end of the rear rollers 38 and roller supports 42 to the front rollers 48 and front roller supports 50.

The front end of the centering apparatus 10 is constructed substantially the same as the rear end except for overall length and the number of live tables. As shown in FIGS. 1 and 2, a front cover 210 is disposed along the longitudinal centerline of the frame 12 and covers a front centering spring and arm assembly. A pair of fixed supports 214 are mounted on the front end of the top surface plate 14 laterally outboard from each of the respective front rollers 48. Apertures 216 and 218 are formed in the front end of the top surface plate 14 over a pair of front moveable tables 220 and 222. Each of the front live tables 220 and 222 is constructed substantially identically as the rear tables 66, 68, 70 and 72 in that each includes a generally planar plate 250 supported at opposite ends by downward extending support members 252 as shown in FIGS. 7A and 7B for the front live table 220.

A pair of spaced rails 254 are connected to each pair of support members 252. A load runner 256 is joined and extends across the support members 252 and is spaced from a lower portion of the rails 254. A cam follower 258 fixed to a support on the frame 12 slides between the load runner 256 and the rail 254 on each corner of the plate 250.

Two springs 260 shown in FIG. 7A are each connected at one end to an eyebolt 262 in the center of the plate 250 and extend laterally and oppositely outward to fixed connections to the frame 12. The springs 260 normally bias the live table to a center position.

A front pushing means is mounted in the frame 12 and includes an elongated front spring shaft 226 having a first end 228, as shown in FIGS. 2, 4A, 4B and 4C. The front spring shaft 226 is mounted within a tube 230 about which a torsion spring 232 is wound. A front pivot block 234 is fixedly mounted at the first end 228 of the spring shaft 226. A pair of front pivot arms 236 and 238 are pivotally connected to opposite ends of the front pivot block 234 and extend laterally outward from the front pivot block 234 to a respective pivotal connection on front slam arms 240 and 242. Each slam arm 240 and 242 is slidably mounted in a guide track on the frame 12.

Each slam arm 240 and 242 has an upper end portion inserted through an aperture in the front roller support member 50. The upper end portion of each slam arm 240, 242, 244, and 246 are fixedly mounted to the front roller support member 50 by means of suitable fasteners, such as nuts and bolts, in the same manner shown in FIG. 6 for the rear slam arms 100. In this manner, the front torsion spring 232 biases the front slam arms 240, 242, 244, and 246 normally laterally outward thereby moving the front roller support members 50 and the front rollers 48 to a normally laterally outboard position as shown in FIGS. 1 and 2.

Figure 4B:
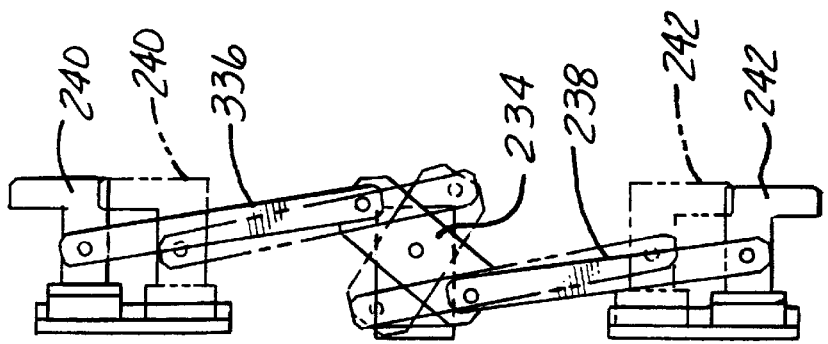
FIGS. 4A, 4B and 4C are top plan, end and side elevational views, respectively, of the front spring and arm assembly partially shown in FIG. 2.
Figure 4A:
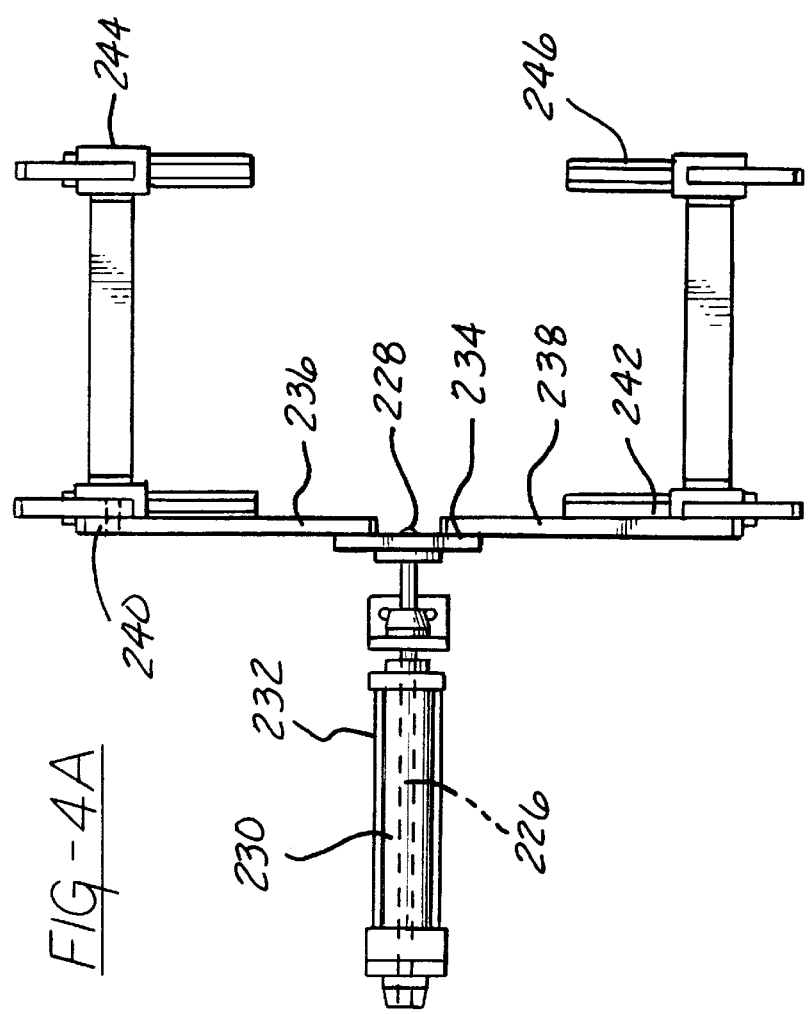
Figure 4C:
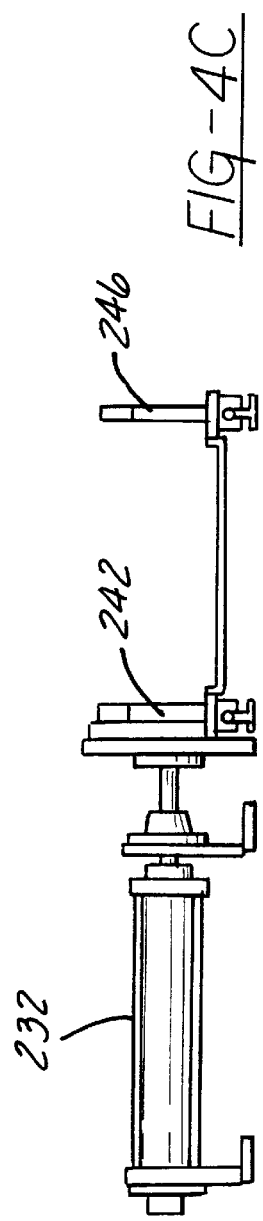

A pair of idler slam arms 244 and 246 are also slidably mounted on guide tracks on the frame 12 and longitudinally spaced from the slam arms 240 and 242 as shown in FIGS. 2 and 4A.

In use of the centering apparatus 10, a vehicle will normally be moved up the rear ramp 18 and along the frame 12 until the front pair of wheels are positioned on the front moveable tables 220 and 222. In this position, the rear pair of vehicle wheels are positioned on one of the lateral pair of rear tables 66, 68 or 70, 72. The provision of two lateral pairs of rear live tables 66, 68 and 70, 72 enables vehicles of differing lengths to be centered on the same centering apparatus 10.

As the vehicle is moved along the frame 12 of the centering apparatus 10, the front wheels and then the rear wheels will engage at least one of the pusher rollers 48 in the case of the front wheels, and the pusher rollers 38 in the case of the rear wheels. Any lateral offset between the longitudinal centerline of the vehicle and the longitudinal centerline of the frame 12 will cause one of the front and/or rear wheels of the vehicle to engage and move the respective pusher roller 48 and 38 inward toward the longitudinal centerline or axis of the frame 12. Due to the interconnection of the rear rollers 38 and roller supports 40 via the slam arms 100 and 102 to the pivot arms 96 and 98, the pivot block 94 and the rear torsion spring 84, lateral inward movement of one of the pusher rollers 38 will cause an equal and simultaneous lateral inward movement of the opposed roller 38. This lateral inward movement is resisted by the torsion spring 84 which tends to urge the pusher rollers 38 laterally outward. Since the rear wheels of the vehicle are mounted on one of the pair of rear live tables, such as the rear live tables 70 and 72, the biasing force exerted by the torsion spring 84 and the pusher rollers 38 causes the rear wheels of the vehicle and the rear live plates 70 and 72 to move laterally equidistantly outward to a centered position wherein the rear end portion of the vehicle is longitudinally aligned with the longitudinal centerline of the frame 12.

The same centering operation occurs for the front wheels of the vehicle through the interaction of the front pusher rollers 48, the front live tables 220 and 222 and the front torsion spring 230. It should be noted that the longitudinal centering of the rear end of the vehicle occurs independently of the longitudinal centering of the front end of the vehicle so as to compensate for any longitudinal skew of the front and rear ends of the vehicle as the vehicle is moved onto the frame 12 of the centering apparatus 10.

What is claimed is:

1. A centering apparatus for centering a vehicle with front and rear pairs of wheels relative to a center longitudinal axis through the centering apparatus, the centering apparatus comprising:

a pair of laterally movable means for receiving each one of one of the front and rear pairs of vehicle wheels thereon;

means for biasing the laterally movable means to a normal position:

a pair of pusher members decouplingly disposed adjacent to the laterally movable means and engageable with at least one wheel of one of the front and rear pair of vehicle wheels disposed on the laterally movable means; and means for biasingly interconnecting the pusher members to urge the pushers members laterally equidistantly outward from each other from a center longitudinal axis through the centering apparatus, the interconnecting means resisting lateral inward movement of the pair of pusher members such that the pusher means urges one pair of vehicle wheels on the movable means laterally to a longitudinally centered position relative to the center longitudinal axis by the pusher members in response to longitudinal off center engagement of one of the vehicle wheels with one of the pusher members, the interconnecting means including:

a spring; and a pair of arms, coupled to the spring and normally urged laterally outward with respect to each other, one arm engageable with one pusher member for pushing the Pusher member laterally outward.

2. The vehicle centering apparatus of claim 1 wherein the laterally movable means comprises:

a platform having a center longitudinal axis;

at least one pair of laterally spaced apertures formed in the platform; and a pair of movable tables disposed within the platform and underlying one of the apertures for receiving one of the vehicle wheels thereon.

3. The vehicle centering apparatus of claim 2 wherein the pusher members comprise;

a pair of longitudinally extending, spaced rails movably extending along the platform;

the arms having a portion extendable through the platform and engageable with the rails.

4. A centering apparatus for centering a vehicle with front and rear pairs of wheels relative to a center longitudinal axis through the centering apparatus, the centering apparatus comprising:

first and second pairs of laterally movable means for receiving each one of one of the front and rear pairs of vehicle wheels thereon;

the laterally movable means including:

a platform having a center longitudinal axis;

first and second pairs of laterally aligned apertures formed in the platform, the first and second pairs of apertures longitudinally spaced apart;

first and second pairs of movable tables movably disposed with respect to the platform and underlying one of the apertures in the platform;

first and second pairs of pusher members, each pusher member associated with each of the first and second pairs of movable tables and engageable with at least one wheel of one of the front and rear pair of vehicle wheels;

means for independently biasingly interconnecting the first and second pairs of pusher members and for biasing the each pusher member in each pair of pusher members laterally equidistantly outward from each other from a center longitudinal axis through the centering apparatus, the interconnecting means resisting laterally inward movement of pair of pusher members such that the front and rear pairs of vehicle wheels are shifted laterally on the first and second pairs of movable tables to a longitudinally centered position relative to the center longitudinal axis by the first and second pusher members in response to longitudinal off center engagement of one of the pairs of front and rear vehicle wheels with one of the pusher members.

5. The vehicle centering apparatus of claim 4 wherein both of the interconnecting means comprises:

a spring; and a pair of arms, coupled to the spring and normally urged laterally outward with respect to each other, one arm engageable with one pusher member for pushing the pusher member laterally outward.

6. The vehicle centering apparatus of claim 5 wherein the pusher members comprise:

a pair of longitudinal extending, spaced rails movably extending along the platform; and the arms having a portion extendable through the platform and engageable with the rails.

7. A centering apparatus for centering a vehicle with front and rear pairs of wheels relative to a center longitudinal axis through the centering apparatus, the centering apparatus comprising:

two pairs of laterally movable means for receiving each one of one of the front and rear pairs of vehicle wheels thereon;

means for biasing the two pairs of laterally movable means to a normal position;

two pairs of pusher members decouplingly disposed adjacent to the laterally movable means and engageable with at least one wheel of one of the front and rear pair of vehicle wheels disposed on the laterally movable means; and means for independently centering the front and rear wheels of a vehicle engageable with the laterally moveable means with respect to a longitudinal center axis of the centering apparatus.

8. The centering apparatus of claim 7 wherein the centering means further comprises:

means for independently biasingly interconnecting each pair of the pusher members and for independently biasing each pair of the pushers members laterally equidistantly outward from each other from a center longitudinal axis through the centering apparatus, the interconnecting means resisting lateral inward movement of each pair of pusher members such that each pair of pusher members urges one pair of vehicle wheels on the laterally movable means to a longitudinally centered position relative to the center longitudinal axis of the platform in response to longitudinal off center engagement of one of the vehicle wheels with one of each pair of the pusher members, the interconnecting means including:

a spring; and a pair of arms coupled to the spring and normally urged laterally outward with respect to each other, one arm engageable with one pusher member for pushing the pusher member laterally outward.

9. The vehicle centering apparatus of claim 8 wherein the laterally movable means comprises:

a platform having a center longitudinal axis;

two pairs of laterally spaced apertures formed in the platform; and a movable table disposed within the platform and underlying one of the apertures for receiving one of the vehicle wheels thereon.

10. The vehicle centering apparatus of claim 9 wherein the two pairs of pusher members comprise;

two pairs of longitudinally extending, spaced rails movably extending along the platform; and the arms having a portion extendable through the platform and engageable with the rails.

11. A centering apparatus for centering a vehicle with front and rear pairs of wheels relative to a center longitudinal axis through the centering apparatus, the centering apparatus compromising:

laterally movable means for receiving each one of one of the front and rear pairs of vehicle wheels thereon;

the laterally movable means including;

a platform having a center longitudinal axis;

a first pair of laterally spaced apertures formed in the platform; and a first pair of movable tables disposed within the platform and underlying one of the apertures for receiving one of the vehicle wheels thereon;

a second pair of laterally aligned apertures formed in the platform and longitudinally spaced from the first pair of apertures;

a second pair of movable tables movably disposed with respect to the platform and longitudinally spaced from the first pair of movable tables;

means for independently centering the front and rear wheels of a vehicle engageable with the laterally moveable means with respect to a longitudinal center axis of the centering apparatus, the centering means including:

first and second Pairs of pusher members associated with the first and second pairs of movable tables, respectively, each positioned for engagement with one wheel of one of the front and rear pairs of vehicle wheels; and means for independently biasingly interconnecting the the first and second pairs of pusher members and biasingly another pair of pusher members laterally equidistantly outward from each other in each pair from a center longitudinal axis through the centering apparatus, the interconnecting means resisting laterally inward movement of each pair of pusher members such that the front and rear pairs of vehicle wheels are shifted laterally on the first and second pairs of movable tables to a longitudinally centered position relative to the center longitudinal axis by the first and second pusher members in response to longitudinal off center engagement of one of the pairs of front and rear vehicle wheels with one of the pusher members, the interconnecting means including:

a spring;

a pair of arms, coupled to the spring and normally urged laterally outward with respect to each other, one arm engageable with one pusher member for pushing the pusher member laterally outward.

12. The vehicle centering apparatus of claim 11 wherein the pusher means comprises:

two pairs of longitudinally extending, spaced rails movably extending along the platform; and the arms having a portion extendable through the platform and engageable with the rails.

* * * * *